(12) United States Patent
Hu

(10) Patent No.: US 6,586,720 B2
(45) Date of Patent: Jul. 1, 2003

(54) TRACKBALL DEVICE WITH TARGET BALL HAVING UNIFORMLY EMBEDDED PARTICLES

(76) Inventor: Ken-Pei Hu, No. 22, Lane 129, Yun Hsiang Shan Chuang, Sheng Kao Village, Sheng Keng Shiang, Taipei Hsien (TW)

( * ) Notice: Subject to any disclaimer, the term of this patent is extended or adjusted under 35 U.S.C. 154(b) by 205 days.

(21) Appl. No.: 09/726,539

(22) Filed: Dec. 1, 2000

(65) Prior Publication Data

US 2002/0066852 A1 Jun. 6, 2002

(51) Int. Cl.[7] .................................................. G09G 5/08
(52) U.S. Cl. ........................................ 250/221; 345/167
(58) Field of Search .............................. 250/221, 222.1, 250/222.2; 345/167, 163, 164, 166, 165, 156, 157

(56) References Cited

U.S. PATENT DOCUMENTS 4,404,865 A * 9/1983 Kim ...................... 250/231.14
5,854,482 A * 12/1998 Bidiville et al. ............ 250/221
6,198,473 B1 * 3/2001 Armstrong .................. 345/163

* cited by examiner

Primary Examiner—Robert H. Kim
Assistant Examiner—Chih Cheng G Kao
(74) Attorney, Agent, or Firm—Bacon & Thomas, PLLC

(57) ABSTRACT

A trackball for controlling the position of a cursor on a display of a personal computer. The trackball includes one or more buttons and a circular opening on the upper housing, a ball formed of transparent or semitransparent material having uniformly embedded reflective particles such as emery powder or the like, and an optical device adjacent the ball in the trackball, the optical device including a light source and a photodetector. When the ball is rotated, the emitted diffuse light from the light source is penetrated through the ball and a predetermined portion of the penetrated light is reflected to the photodetector through the ball by the particles such that the photodetector is capable of creating an image of an illuminated portion of the ball from the reflected light and calculating a direction and a distance proportional to the rotation of the ball. This can eliminate the inconsistency between the rotating ball and the moving cursor.

12 Claims, 3 Drawing Sheets

TRACKBALL DEVICE WITH TARGET BALL HAVING UNIFORMLY EMBEDDED PARTICLES

FIELD OF THE INVENTION

The present invention relates to trackballs and more particularly to a trackball device with target ball having uniformly embedded particles for creating a clear image of an illuminated portion of the ball, resulting in a precise corresponding movement of cursor on a display of computer.

BACKGROUND OF THE INVENTION

A conventional trackball device 1 such as disclosed in U.S. Pat. Nos. 5,288,993 and 5,703,356 is shown in FIG. 1 comprising an upper housing 10 and a lower housing 11 being for example threadedly secured together. Necessary circuitry and electronic components are mounted within trackball 1. One button (or more than one button in other implementations) 12 and a circular opening 14 are formed on upper housing 10. A ball 20 is fitted in the opening 14 with the upper half portion projected above the surface of upper housing 10 such that user may rotate ball 20 with hand. An optical device 30 is adjacent ball 20 within the trackball device 1 for emitting light to ball 20 and creating an image of an illuminated portion of the ball 20 from the reflected light thereof so as to process and calculate a direction and distance proportional to the rotation of the ball 20 as detailed below.

An enlarged and detailed view of ball 20 and optical device 30 is shown in FIG. 2. Optical device 30 comprises a light source 31 for flooding a portion of ball 20 with diffuse light and a photodetector 32 for creating image of an illuminated portion of the ball 20 from the reflected light thereof. Trackball device 1 then processes such fetched images and compares the difference between a previous image and a current one. Further, a direction and distance proportional to the rotation of the ball 20 is calculated if the difference exists. Hence, a corresponding movement of cursor will be shown on a display screen of for example personal computer which is electrically coupled to trackball device 1. In view of above, the quality of fetched image will be critical to the precision of the calculated direction and distance of a moving cursor.

A number of things are proposed herein for manufacturers and designers to consider. For example, the smoothness of the rotation and the maneuverability of ball 20 are important factors since trackball device 1 is designed to be rotated by user for moving a cursor on screen. Conventionally, ball is of hard construction (e.g., molded thermoplastic) and has a very smooth surface for facilitating rotational operation by reducing friction and for preventing from being deformed. But this is unsatisfactory for the purpose for which the invention is concerned because an intense diffuse light is reflected (since the surface of ball 20 is very smooth) after light is flooded onto the ball 20 from light source 31. As such, the effect of photodetector 32 of creating an image of an illuminated portion of the ball 20 from the reflected light is compromised while only the intense diffuse light is received. This makes a correct comparison between the previous image and the current one impossible. Thus a correct calculation of direction and distance proportional to the rotation of the ball 20 is not obtained. Hence, a precise movement of cursor will not be shown on display screen. The prior art shown in FIG. 2 discloses a technique of printing a plurality of uniformly arranged spots 21 on the surface of ball 20 for decreasing the reflectivity of diffuse light from ball 20. As a result, a clear image of an illuminated portion of the ball 20 may be created by photodetector 32. However, the previous design still suffered from several disadvantages. For example, it is high in manufacturing cost. Further, the sharpness of the created image is necessarily limited by the smoothness of the surface of ball 20.

Thus, it is desirable to provide an improved trackball device in order to overcome the above drawbacks of prior art.

SUMMARY OF THE INVENTION

It is an object of the present invention to provide a trackball device wherein the ball is formed of transparent or semitransparent hard thermoplastic material having the advantages of very smooth surface, being resistant to deform, reduced friction, and high maneuverability.

It is another object of the present invention to provide a trackball device wherein a plurality of uniformly disposed reflective particles are formed within the transparent or semitransparent hard thermoplastic material such that most of emitted diffuse light from a light source is penetrated through the ball and a portion of the penetrated light is reflected to a photodetector through the surface of ball by the particles. Photodetector can create an image of an illuminated portion of the ball from the reflected light thereof and calculate a correct direction and distance proportional to the rotation of the ball. Hence, a precise corresponding movement of cursor will be shown on a display screen. As a result, the prior art drawback of inconsistency between the rotating ball and the moving cursor is eliminated.

The above and other objects, features and advantages of the present invention will become apparent from the following detailed description taken with the accompanying drawings.

DETAILED DESCRIPTION OF THE PREFERRED EMBODIMENTS

Figure 1:
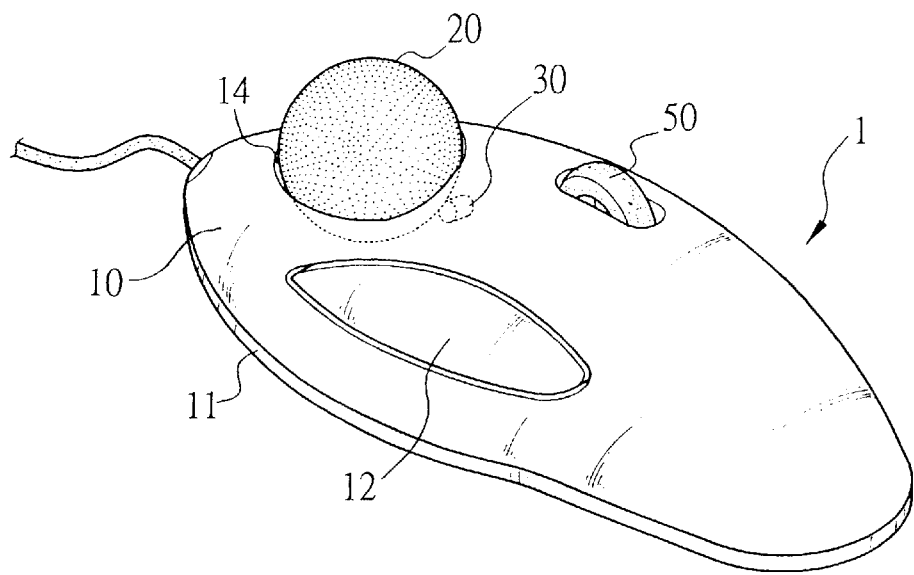
FIG. 1 is a perspective view of a conventional trackball device.
Figure 2:
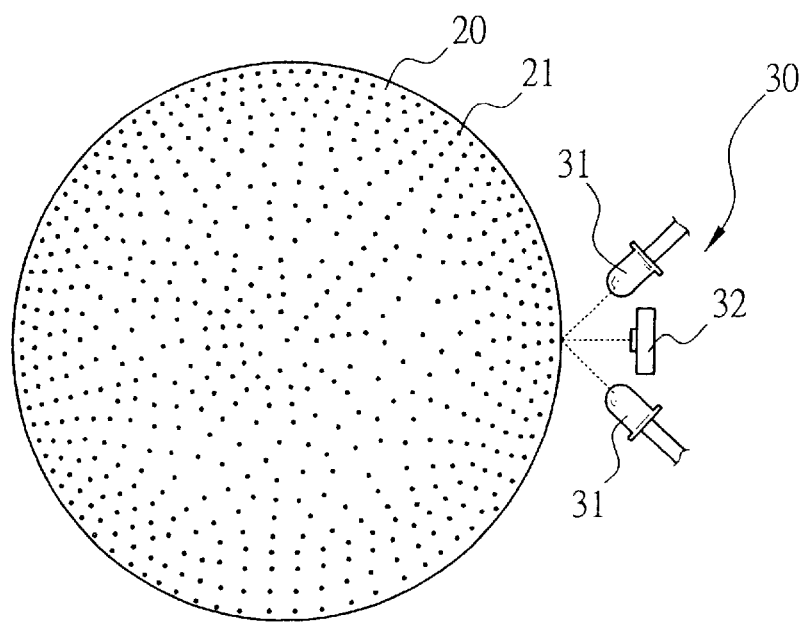
FIG. 2 is an enlarged and detailed view of the ball and optical device shown in FIG. 1.
Figure 3:
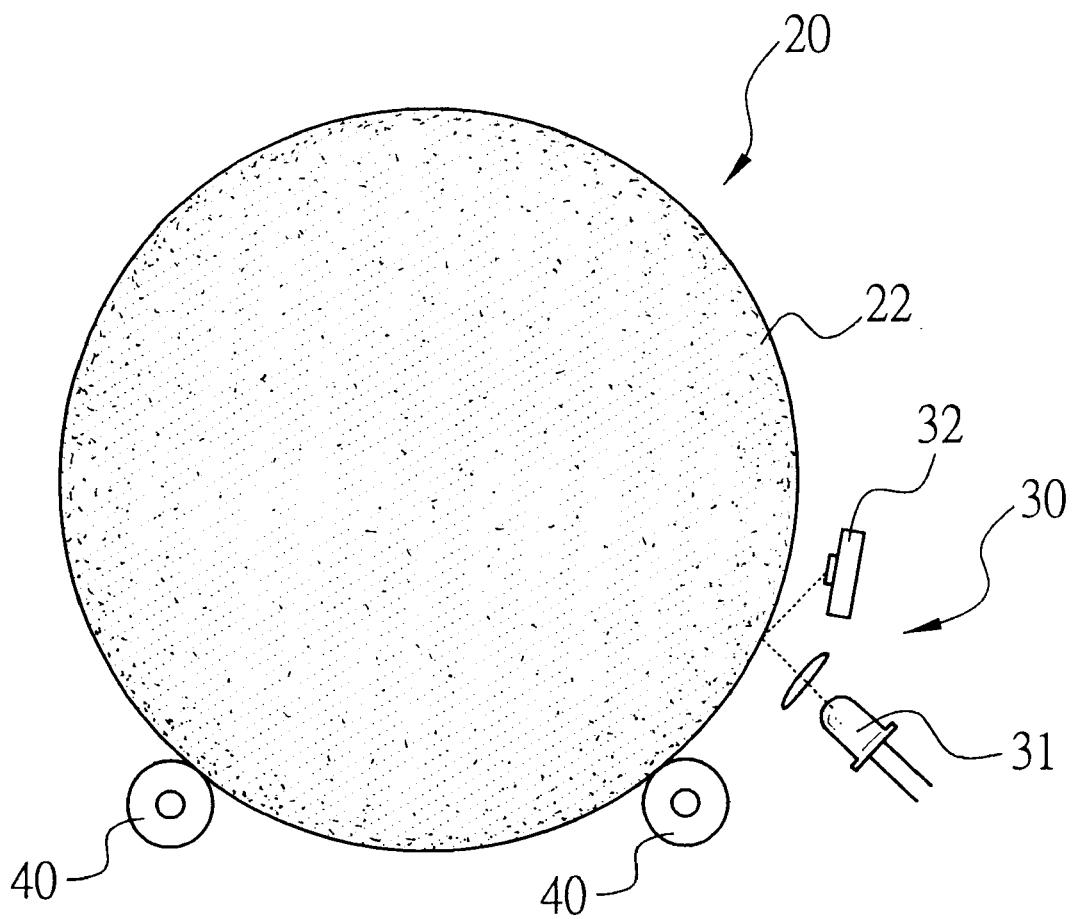
FIG. 3 is a schematic view showing ball, optical device and supports of a trackball device according to the invention.

Note that the trackball device of the invention is substantially the same as that of prior art shown in FIG. 1 except trackball 20. Referring to FIGS. 1 and 3, similarly trackball device of the invention comprises an upper housing 10 and a lower housing 11 being for example threadedly secured together. Necessary circuitry and electronic components are mounted within trackball 1. One button (or more than one button in other embodiments) 12 and a circular opening 14 are formed on upper housing 10. A ball 20 is fitted in the opening 14 with the upper half portion projected above the surface of upper housing 10 and the lower half portion being maintained in a rotatable position by a plurality of supports (e.g., bearings or steel balls) 40 within the trackball device. As such, a user may rotate ball 20 with hand. An optical device 30 is adjacent ball 20 within the trackball device 1 for emitting light to ball 20 and creating an image of an illuminated portion of the ball 20 from the reflected light thereof so as to process and calculate a direction and distance proportional to the rotation of the ball 20 as detailed later. Also, a wheel 50 is adjacent button 12. Wheel 50 may be activated to perform a scrolling or line feed on screen. But such wheel 50 is well known. Thus a detailed description thereof is omitted herein for the sake of brevity.

Figure 4:
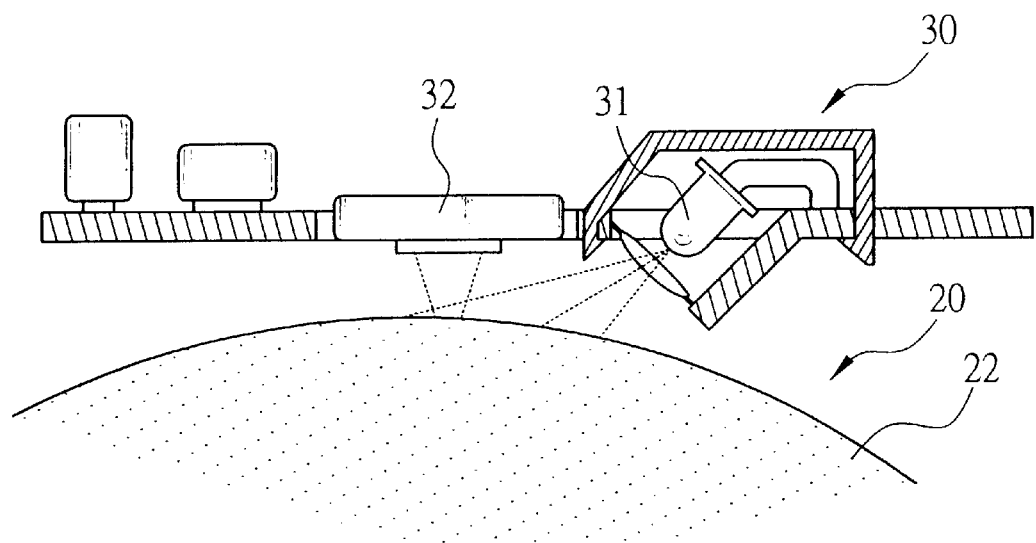
FIG. 4 shows a more detailed view of the ball and optical device shown in FIG. 3.
Figure 5:
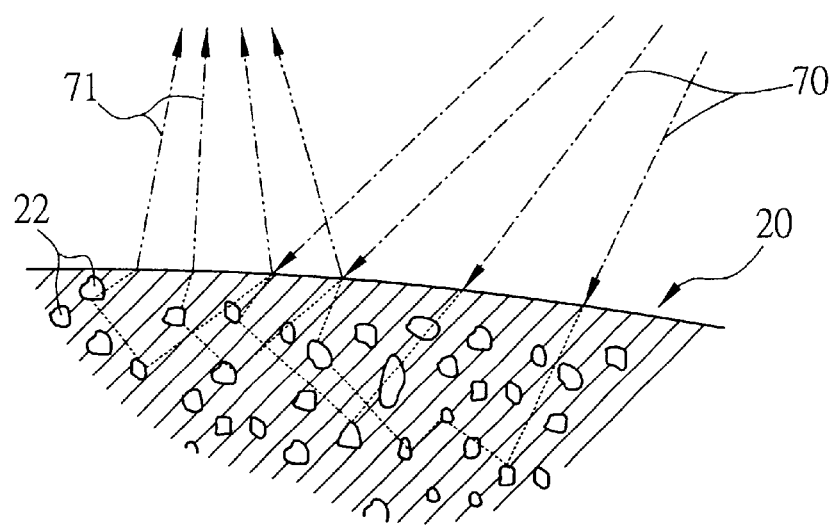
FIG. 5 is a schematic cross-sectional view showing the reflection of diffuse light by the ball shown in FIG. 3 according to the invention.

Referring to FIGS. 4 and 5, a detailed description of the features of the invention will now be discussed. Ball 20 is formed of transparent or semitransparent hard thermoplastic material in which a plurality of uniformly disposed reflective particles (e.g., emery powder or the like) 22 are formed. Hence, most of emitted diffuse light from a light source 31 of optical device 30 is penetrated through the ball 20 and a portion of the penetrated light is reflected to a photodetector 32 through the surface of ball 20 by the particles 22. Photodetector 32 can create an image of an illuminated portion of the ball 20 from the reflected light thereof and calculate a correct direction and distance proportional to the rotation of the ball 20. Hence, a precise corresponding movement of cursor will be shown on a display of for example personal computer which is electrically coupled to trackball device. This substantially eliminates the drawbacks of prior art such as the effect of photodetector 32 of creating an image of an illuminated portion of the ball 20 from the reflected light being compromised while only the intense diffuse light received which in turn makes a correct comparison between the previous image and the current one and a correct movement of cursor on screen impossible.

In one preferred embodiment of the invention, a plurality of processes are performed for manufacturing a ball 20. First, mix a transparent or semitransparent resin and a plurality of reflective particles (e.g., emery powder, mica powder, or pearl powder) 22. Then add a predetermined amount of hardener into the mixed resin and particles. Next stir and make it even with a stirrer. Then pour it into a plurality of molds. The plurality of uncompleted balls are formed after molds are hardened and cooled. Then grind the uncompleted balls by a grinder in order to form a ball with desired size (i.e., sphere). Next polish the ball until a desired smoothness is obtained. Finally, uniformly coat wax on the ball. As a result, a smooth ball with a plurality of uniformly disposed reflective particles is produced.

Thus formed ball 20 has the advantages of very smooth surface, being resistant to deform, reduced friction, and high maneuverability since it is made of transparent or semitransparent hard thermoplastic material. Further, a plurality of uniformly disposed reflective particles 22 are embedded in the ball 20. Referring to FIG. 5 specifically, most of emitted diffuse light 70 from a light source 31 is penetrated through the ball 20 and a portion 71 of the penetrated light is reflected to a photodetector 32 through the surface of ball 20 by the particles 22. Thus photodetector 32 can create an image of an illuminated portion of the ball 20 from the reflected light 71 thereof and calculate a correct direction and distance proportional to the rotation of the ball 20. Hence, a precise corresponding movement of cursor will be shown on a display of the personal computer which is electrically coupled to trackball device. As a result, the prior art drawback of inconsistency between the rotating ball and the moving cursor is eliminated.

While the invention has been described by means of specific embodiments, numerous modifications and variations could be made thereto by those skilled in the art without departing from the scope and spirit of the invention set forth in the claims.

What is claimed is:

1. A trackball for controlling the position of a cursor on a display of a personal computer comprising:

a housing consisting of an upper housing and a lower housing with necessary electronic components mounted therein;

at least one button on the upper housing;

a circular opening on the upper housing;

a ball formed of transparent material having a plurality of uniformly embedded reflective particles, the ball being fitted in the circular opening with the upper half portion of the ball projected above the upper housing and the lower half portion thereof maintained in a rotatable position by a plurality of rotatable members within the trackball; and an optical means adjacent the ball in the trackball, the optical means including a light source for emitting diffuse light and a photodetector, wherein when the ball is rotated, the emitted diffuse light is penetrated through the ball and a predetermined portion of the penetrated light is reflected to the photodetector through the surface of the ball by the particles such that the photodetector is capable of creating an image of an illuminated portion of the ball from the reflected light and calculating a direction and a distance proportional to the rotation of the ball.

2. The trackball of claim 1, wherein the ball is formed of semitransparent material having a plurality of uniformly embedded reflective particles.

3. The trackball of claim 1, wherein the material is a combination of resin, a plurality of reflective particles, add a predetermined hardener being evenly stirred and hardened.

4. The trackball of claim 1, wherein the particles are formed of emery powder.

5. The trackball of claim 1, wherein the particles are formed of mica powder.

6. The trackball of claim 1, wherein the particles are formed of pearl powder.

7. The trackball of claim 1, further comprising a wheel adjacent to the button for performing a scrolling of the display.

8. The trackball of claim 2, wherein the material is a combination of resin, a plurality of reflective particles, add a predetermined hardener being evenly stirred and hardened.

9. The trackball of claim 2, wherein the particles are formed of emery powder.

10. The trackball of claim 2, wherein the particles are formed of mica powder.

11. The trackball of claim 2, wherein the particles are formed of pearl powder.

12. The trackball of claim 2, further comprising a wheel adjacent to the button for performing a scrolling of the display.

* * * * *